Jan. 19, 1954  C. W. VOGT  2,666,400
PRODUCTION OF PLASTIC MASSES
Filed May 25, 1949  2 Sheets-Sheet 2

INVENTOR.
CLARENCE W. VOGT
BY
ATTORNEY.

Patented Jan. 19, 1954

2,666,400

UNITED STATES PATENT OFFICE 2,666,400

PRODUCTION OF PLASTIC MASSES

Clarence W. Vogt, Norwalk, Conn.

Application May 25, 1949, Serial No. 95,270

14 Claims. (Cl. 107—15)

This invention relates to the production of units or masses of plastic material and in particular to a method of and apparatus for forming units of plastic material of a predetermined size, shape and amount.

This application is a continuation-in-part of my copending applications Serial No. 90,852, filed May 2, 1949, and entitled Production and Packaging of Plastic Materials; and Serial No. 93,599, filed May 16, 1949, and entitled Production of Plastic Masses.

It is an object of the present invention to provide a method of and apparatus for producing formed masses of plastic material which may be accurately measured to a predetermined size, shape, and amount. In present day formation of molded plastic masses the problems of accurately measuring the amount of plastic material require that the producer of such masses provide a tolerance in the amount of each mass to insure obtaining adequate measure. The problem is particularly acute in connection with plastics such as butter or margarine which must be, by governmental authority of a stated quantity usually expressed in terms of weight. To avoid the merchandising of packages which do not meet the measured quantity, producers form the masses with more than the measured amount but show on the package the necessary minimum quantity. Over a period of time the cost of the materials and labor expended in producing this excess quantity amount to a considerable sum which could be saved if more accurate masses were obtained.

In previous methods of production of formed masses of plastic material, difficulties are encountered in forcing the plastic into a molding cavity so as to completely fill the molding cavity and thus insure that the masses produced are uniformly accurate. A feature of the present invention is the production of plastic masses by overfilling the molding cavity and expelling any excess over the desired amount to insure that the molding cavity is completely filled.

Another object of the present invention is to provide a method of and apparatus for producing masses of plastic material utilizing a molding cavity to obtain the desired predetermined shape and amount in which the plastic in the molding cavity may be compacted to insure a complete filling of the molding cavity.

In the present day commercial production of formed masses of plastic material the plastic material is made and flowed to a forming apparatus. Plastic material is intermittently forced from the source of supply into a molding cavity and the molding cavity is moved to a position from which the mass is ejected. Additional plastic material cannot be fed from the source of supply until the molding cavity has been returned to its original position. This results in a stopping and starting of the flow of plastic material which may adversely affect the physical characteristics of the plastic material. For example, in the production of margarine the desired ingredients are generally mixed while liquid and subsequently crystallized to a plastic state. The consistency and other physical characteristics of the plastic will obviously be affected by intermittent motion of the plastic. It is therefore a further object of the present invention to provide a method of and apparatus for producing formed masses of plastic material in which the plastic material may be continuously flowed from the source of supply without intermittently starting and stopping such flow.

Another object is to provide a method of and apparatus for forming plastic materials in which the plastic may be formed or expelled from the molding cavity in a direction perpendicular to a plane passing through the smallest cross sectional area of the resultant mass. It has been found difficult to force plastic material into a hollow molding cavity and therefore it is conventional to position the molding cavity so that it has a depth corresponding to a smaller dimension of the plastic mass. However, according to the present invention, filling of the molding cavity is facilitated and it is believed preferable to position the molding cavity so that its cross section corresponds to the smallest cross section of the mass to be formed. While this may increase the depth of the molding cavity it permits adjustment of the size of the molding cavity so that the amount of the plastic mass may be varied in accordance with changes which inherently occur in the consistency of the plastic material.

Other objects and advantages will become apparent from the following detailed description accompanied by the drawings in which.

The present invention deals with the production of units or masses of a plastic substance or materials. For the purposes of this description the term "plastic substance" or "plastic material" means a semi-plastic or plastic or partially set or solidified substance which under the conditions at the time it is being acted on may be formed or molded or extruded by the use of relatively low pressures. Such materials may be flowed or forced through relatively small conduits or passages by the application of pressure. However, such materials will generally not flow under the influence of gravity to an appreciable extent. Examples of plastic materials to which the present invention may be applied are butter, margarine, lard, partially frozen confections such as ice cream, etc., and many other materials whether edible or not, having the capacity of being flowable or moldable.

In essence, the present invention may be carried out by forcing plastic material from a suitable source of supply into a molding cavity while simultaneously retracting a piston member mounted for sliding movement in the molding cavity. After the molding cavity has been filled with the desired amount of plastic material the piston member may be moved to expel or form a unit or mass of plastic material having the desired predetermined size, shape, and amount. As a portion of the filling cycle, and to facilitate completely filling of the molding cavity and compacting of the plastic material therein the piston member may be retracted beyond the desired amount for the plastic mass to be produced and then moved to expel any excess of plastic material.

Figure 2:
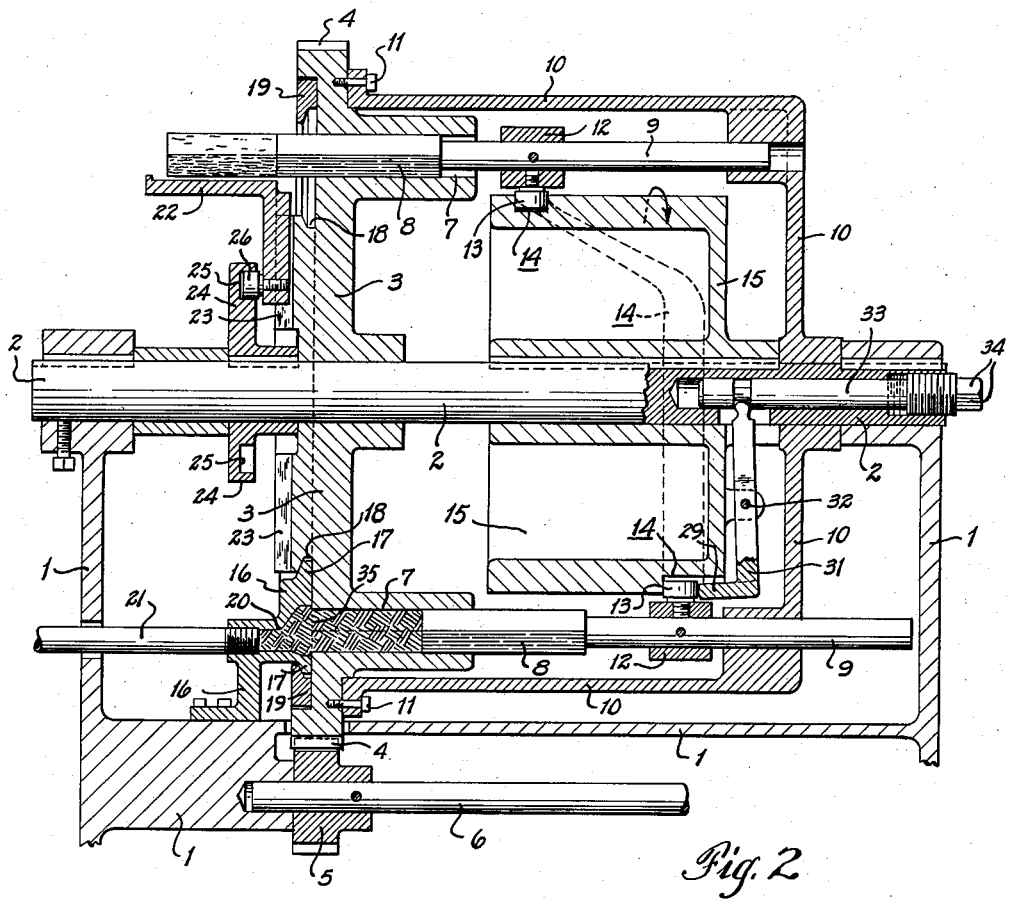
Fig. 2 is a sectional view with parts broken away or removed of a preferred form of apparatus for carrying out the present invention shown in semi-diagrammatic form.

Fig. 2 shows in section a diagrammatic form of a mechanism which may be used to carry out the principles of the present invention. The numeral 1 designates a supporting frame of the apparatus and mounted within suitable portions of the frame may be a stationary shaft 2. The shaft 2 carries for rotation a rotary member 3 which may carry at its outer periphery gear teeth 4. To drive the rotary member a pinion 5 may be mounted so that it will mesh with the gear teeth 4. The pinion may be mounted for rotation on a driving shaft 6 journaled in the frame 1 and driven from any suitable source of rotary power (not shown).

Opening from an end face of the rotary member 3 may be one or more molding cavities 7 each of which is adapted to receive plastic material under pressure. To assist in filling the molding cavities, a piston member 8 may be mounted for sliding movement therein. To actuate the piston with the desired motion in synchronism with other portions of the mechanism, the pistons may be carried by piston rods 9. The free ends of the piston rods 9 are preferably journaled in a housing member 10 mounted on the shaft 2 and secured to the rotary member 3 such as by bolts 11. This will insure aligned movement of the piston with the molding cavity and where the nature of the plastic material requires a relatively close fit between the piston and molding cavity wall to avoid undue leakage, proper support and guided movement of the piston member may be necessary from a practical standpoint. Pinned to each of the piston rods 9 at a suitable point spaced from the end face of the rotary member 3 may be a sleeve 12 with a roller follower 13 carried by each of the sleeves 12. The followers 13 are adapted to be engaged in a cam track 14 formed in a cylindrical cam 15 which is keyed or otherwise fixed to the shaft 2.

Mounted adjacent the end face of the rotary member 3 and in abutment therewith may be a suitable manifold or member 16 which remains stationary and may, if desired, be bolted or otherwise secured to the frame 1. The manifold 16 is positioned so that it is adjacent the path of the molding cavities which come into alignment therewith as the rotary member 3 moves. To adjustably hold the face of the manifold 16 against the face of the rotary member 3 with the desired pressure to prevent undue leakage during movement of these parts with respect to each other, the manifold may be provided with tapered flange portions 17 along its marginal edges. Inwardly of the molding cavity the tapered flange portion 17 may be disposed in a groove or track 18 formed in the rotary member 3. Outwardly of the molding cavity the tapered flange portions 17 may be held in place by a removable ring member 19 having a tapered surface complementary to that of the flange portion 17. The ring member 19 is preferably split into appropriate segments to facilitate removal of the manifold when desired for cleaning or other purposes. These removable segments of the ring member 19 may be held to the rotary member 3 in any suitable manner such as by bolts (not shown). It is also desirable to design and construct the removable ring member 19 so that it may be adjusted in a generally radial direction with respect to the stationary shaft 2 and as may be seen in the lower portion of Fig. 2 this will vary the degree of tightness with which the manifold 16 is held against the face of the rotary member 3. This adjustment is important to provide a variation in the pressure with which the manifold is held to the rotary member to take up looseness which might occur due to wear of the manifold and to facilitate handling of different types of material on the apparatus.

The manifold 16 is provided with a generally centrally disposed aperture 20 therethrough so that plastic material may be flowed from a suitable conduit or supply line 21 through the manifold and into the molding cavity. The manifold 16 and supply line 21 may be connected to any suitable source of supply of the plastic material which will force or flow the desired amount of plastic therethrough. For example, the plastic material may be supplied to a hopper or other receptacle in communication with a gear pump, helical screw, piston pump, etc., to force plastic through the supply line 21.

Alternatively the conduit 21 might be supplied with material directly from a continuous process apparatus capable of producing plastic material. This is believed to be especially advantageous since the apparatus shown in the drawings may be designed to accommodate the full production of the material and in effect supplements the continuous processing from manufacture of the material until it is formed into measured units. With a number of materials, the consistency of which may vary, it is believed desirable to maintain the material in motion to avoid affecting the consistency. According to the present invention the mechanism may be designed and constructed so that material is continuously moving through the conduit and the manifold and into the molding units or cavities in the rotary member 3.

It will also be obvious that the manifold may be of any desired arcuate extent and may even be a multiple manifold so that each molding cavity may receive partial charges of the same or different material from each station of the multiple manifold. Such an arrangement would be particularly beneficial, for example, in the production of a composite confection such as multiflavored ice cream or the like.

During movement of the rotary member 3 the molding cavities 7 are successively brought into registry with the manifold 16 where the piston 8 may be retracted and plastic material forced into the molding cavity to fill the same. Further movement of the rotary member 3 will move the molding cavities and break communication between the aperture 20 of the manifold and the opening to the molding cavity. At any desired point in the movement of the rotary member 4 the piston members 8 may then be moved in a direction to expel or extrude the plastic material from the molding cavity and deposit the formed mass at a desired point outwardly of the opening to the molding cavity.

Fig. 2 illustrates a support member 22 which may be mounted for sliding movement along the end face of the rotary member 3 to receive and support the formed mass. A support member 22 may be mounted radially inwardly from each of the molding cavities and to provide accurate sliding movement in a radial direction along the end face of the rotary member 3, support members may be mounted in dovetailed tracks or guideways 23. Thus, as the formed mass is expelled from the molding cavity the support member 22 may move radially outwardly into receiving position as indicated at the top of Fig. 2. The support member may also be moved radially inwardly after the formed mass has been removed therefrom and before it reaches the location of the manifold so that there will be no interference between the support member and the manifold.

If desired the support member 22 may be provided with a suitable enwrapment before the formed mass is deposited therein to facilitate packaging of the mass after it has been deposited. A more complete description of the packaging of formed masses of plastic material may be found in my copending application Serial No. 90,852, filed May 2, 1949, and entitled Production and Packaging of Plastic Materials. As described in said application, after the plastic mass has been deposited in an enwrapment and the enwrapment has been disposed therearound, the support member may be moved with respect to the piston member to cleanly separate or remove the plastic mass from the piston and wipe any plastic tending to adhere from the piston face. Movement of the support member may be extremely important to provide a clean removal of the plastic mass from the piston face where the plastic material has a tendency to adhere to surfaces it contacts and particularly where each mass of plastic is to be accurately and uniformly measured. The desired actuation of the support member may be obtained by a face cam 24 secured in fixed relation to the shaft 2 and provided with a cam track 25 of a desired configuration. Each of the support members 22 carries a roller follower 26 which is adapted to be engaged by the cam track 25.

As shown in the drawings each of the molding cavities is positioned and dimensioned so that the cavity is filled and emptied of plastic material by movement in a direction perpendicular to a plane passing through the smallest cross sectional area of the resultant mass. This increases the depth of the molding cavity as compared with present day commercial constructions but the problems of filling the molding cavity and displacing the air therefrom are facilitated by the use of a slidable piston which is retracted simultaneously with the introduction of plastic material under pressure into the molding cavity. Further, the size and shape of the molding cavity may also have considerable affect on the ease of completely filling the molding cavity. As shown in the drawings the molding cavity is square in cross section as is also the piston member, however, it will be understood that the molding cavity and piston may have many other desirable cross sectional shapes such as round, triangular, rectangular, hexagonal, etc.

With a view toward assuring that the molding cavity is completely filled with plastic material and thus will produce accurate and uniform molded plastic masses, the cam track 14 of the cylindrical cam 15 which influences the piston 8 through the roller follower 13 and the piston rod 9 may be designed so as to permit overfilling of the molding cavity and expulsion of any excess plastic material over that desired.

Figure 1:
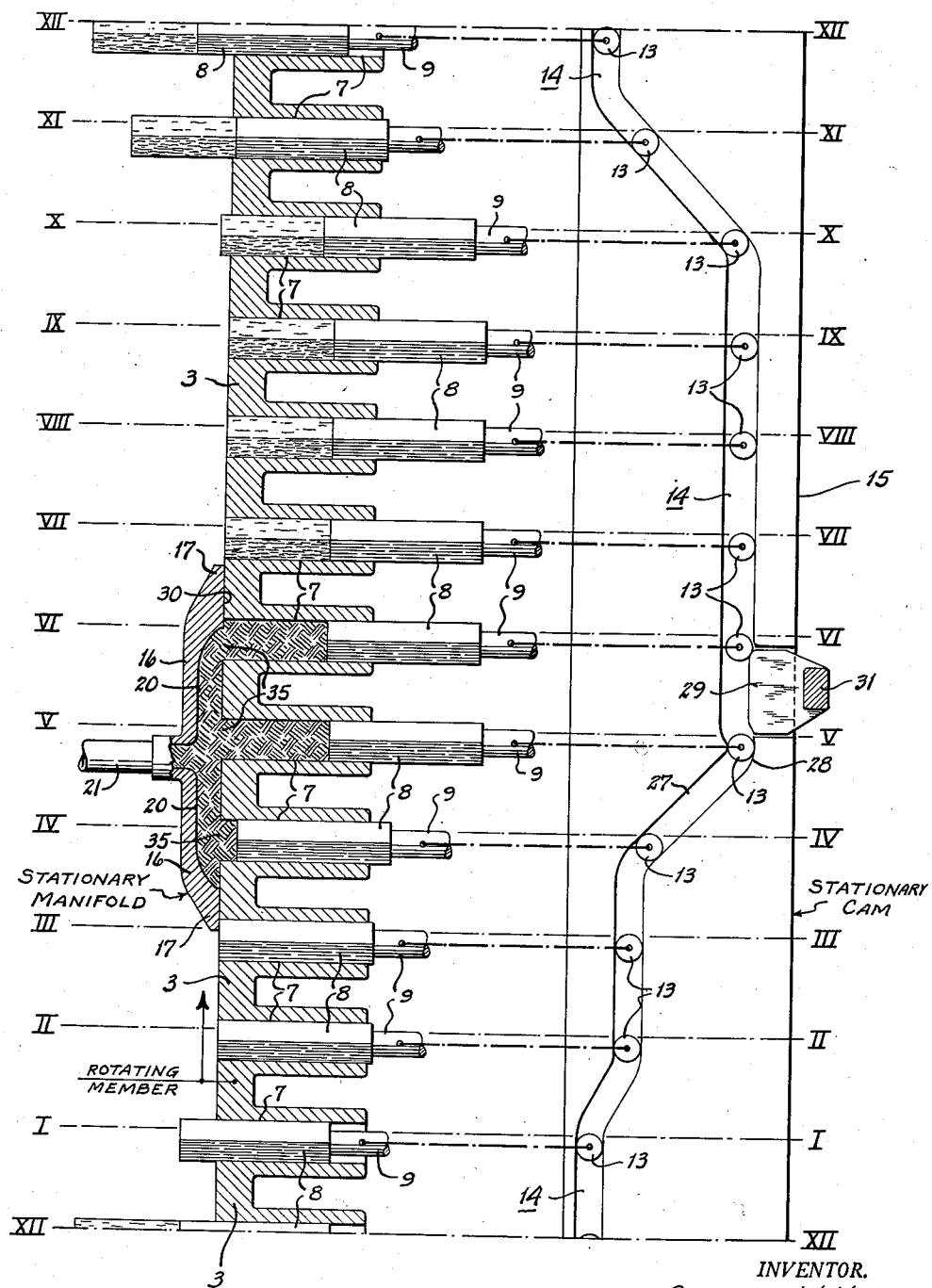
Figure 1 is a diagrammatic developed view of portions of the apparatus embodying the present invention to illustrate the sequence and principles of operation.

Figure 1 shows a developed view in semi-diagrammatic form of the cam track 14 and in the same view the pistons, molding cavities, and manifold are shown, to permit a clear understanding of the sequence of motions which take place during movement of the rotary member. A total of twelve molding cavities and piston assemblies were selected and shown as disposed around the end face of the rotary member since this would provide the proper spacing to permit a continuous flow of the plastic material through the supply line 21 and the aperture 20 through the manifold 16. For convenience in reading Figure 1 the cam 15 and cam track 14 have been subdivided into twelve equal sections which have been numbered with Roman numerals from I to XII. For purposes of illustration the position of the portions indicated by the Roman numerals may be thought of as corresponding with the hours on a clock face. Accordingly, at the position indicated as being approximately III o'clock, a molding cavity 7 with its poston 8 substantially flush with the end face of the rotary member 3 is moving under the marginal edge of the manifold 16. Shortly before reaching the position indicated by IV o'clock the molding cavity is in communication with the aperture 20 through the manifold 16 and is in communication also with the plastic material under pressure. At approximately this same time the cam track 14 curves to the right looking at Figure 1 and acts to withdraw the piston into the molding cavity, permitting the plastic material under pressure to be forced thereinto displacing the piston. The angularity of that portion of the cam track 14 (indicated by numeral 27 in Figure 1) which causes a withdrawal of the piston, is preferably such that the piston is retracted at a rate equal to or slightly less than the flow of plastic material into the cavity under the influence of the pressure which has been applied to it. In this way the piston may maintain a slight compacting effect during the forcing of the plastic material into the molding cavity. The retracting of the piston is continued to a point beyond the point at which the molding cavity contains sufficient plastic material to form a mass of the desired size so that the molding cavity is overfilled by any desired amount. Following this overfilling the piston is returned to expel any excess of plastic material from the molding cavity. This overfilling and expelling action is created by the curved portion of the cam track 14 which occurs just before V o'clock and is indicated by the numeral 28.

It may be noted that the overfilling and expulsion of excess is accomplished while the molding cavity is in communication with the aperture 20 through the manifold which contains the plastic material under pressure. This means that the plastic material in the molding cavity is subjected to pressure at both ends which will cause a compacting of the plastic material to assist in insuring complete filling of the molding cavity and the formation of plastic masses of uniform density.

The size and shape of the molding cavity and the length of stroke of the piston control the measured amount of plastic material to be produced. However, it is generally considered desirable to provide for an adjustment in this measured amount to take care of variations in the physical characteristics of the plastic material. For example, in the production of unit masses of margarine or butter, weather conditions and the permissible degree of control of the manufacturing conditions result in variations in the properties of the product, such as, density, percentage of entrained air, and the like. In order to maintain a constant weight for a unit mass it is necessary to be able to adjust the volume of the molding cavity. This may be done by providing an adjustable portion of the cam track 14 at a point where the molding cavity is beneath the manifold and being filled.

Figs. 1 and 2 illustrate a mechanism to accomplish the desired result. The section of the rear wall of the cam track which will be contacted by the roller follower 13 after it leaves the portion 28 of the cam track may comprise a movable piece or section 29 which will control the final size of the molding cavity by controlling the rearward extent of the piston member. It will be noted that the movable section 29 of the rear wall of the cam track 14 extends approximately from V to VI o'clock and after the roller follower 13 has passed thereover the molding cavity moves under the sealing land of the manifold indicated by the numeral 30 in Figure 1. This means that the molding cavity is no longer in communication with the plastic material under pressure and the amount of plastic material in the molding cavity becomes a fixed quantity. The movable section 29 may be actuated for adjustment in any desired manner.

Figure 2 (which may be considered as a section along radial lines, one of which extends midway between V and VI o'clock and the other of which extends midway between XI and XII o'clock) illustrates the section 29 as comprising an extension or foot of a lever 31 which lever is pivotally mounted between its ends to a portion of the stationary cam 15 at the location indicated by the numeral 32. The opposite end of the lever 31 may be provided with a rounded portion engaged in a reduced section of an adjusting pin 33 threadedly mounted in the end of the stationary shaft 2. The adjusting pin 33 may be provided with flat lands 34 suitable for accommodating a wrench or hand wheel or other desired regulating mechanism. As the adjusting pin is rotated it engages the rounded end portion of the lever 31 pivoting it about the pivot point 32 to move the section 29 of the cam track to vary the inward limit of the travel of the piston 8. Thus, as the rotary member 3 moves and the roller follower 13 under the influence of the portion 28 of the cam track 14 permits overfilling of the molding cavity, the roller follower causes the piston to expel the excess of plastic material in the molding cavity. Since the movable cam section 29 defines the final inward limit of the piston travel the amount of excess expelled will be determined by the position of the movable section 29.

Where the plastic material has internal pressure due to factors such as entrained air, there may still be a pressure on the measured amount of plastic and if the molding cavity were to leave the marginal edge of the manifold the first portion of the plastic to be exposed might tend to expand and give an uneven surface at the opening of the molding cavity. To obviate this the cam track 14 may be widened for an appreciable distance beginning with the movable section 29. In Figure 1 it may be noted that the cam track has a widened portion which extends from the position indicated by V o'clock to approximately the position indicated by X o'clock. If the plastic material has any internal pressure and since the front surface of the molding cavity has been covered by the sealing land 30 the internal pressure will cause the piston 8 and the follower 13 to retract which is permissible due to the widened portion of the cam track. Further, during continued movement of the rotary member 3 from the VI o'clock position to the X o'clock position the follower 13 is free to float between the walls of the cam track and assume whatever position it may, limited by the widened cam track walls.

Shortly before the position indicated by X o'clock the cam track 14 curves to the left and causes the piston member to expel plastic material from the molding cavity. To carry the plastic mass outwardly from the end face of the rotary member and deposit the same in the support member 22 the piston member moves through the opening of the molding cavity a desired amount and from Figure 1 it may be seen that this action is complete at the position approximately midway between XI o'clock and XII o'clock. The piston continues at this position until approximately I o'clock which gives sufficient time for accomplishing the removal of the formed mass from the piston and the wiping of the piston face. At about I o'clock the piston moves inwardly until it is flush or substantially flush with the end face of the rotor so that it can pass under the manifold to be filled again with plastic material.

The arrangement and spacing of the molding cavities as illustrated in Figure 1 has the advantage of permitting a continuous flow of plastic material from the source of supply through the manifold and into successive molding cavities, which move through a continuous closed path and thus form a sequence of plastic masses. This feature is illustrated by examination of Figure 1 where it may be seen that a molding cavity is disposed at approximately the position indicated by V o'clock, at which point the curved portion 28 of the cam track is beginning to cause expulsion of excess plastic material from the molding cavity. At the same time the succeeding molding cavity disposed approximately at the position indicated by IV o'clock is in communication with plastic material under pressure in aperture 20 of the manifold 16 and its roller follower 13 is just beginning to pass along the portion 27 of the cam track 14 which will cause the piston to be retracted and permit filling of the molding cavity. It is considered that this continuous flow of the plastic material is extremely desirable since it avoids any deleterious effect on physical properties of the plastic material due to intermittent flow and the intermittent application of pressure to the plastic material.

It will be seen that the molding cavity opening, indicated by the numeral 35 in Figs. 1 and 2, disposed at the end face of the rotary member 3, determines the cross sectional configuration of the plastic mass produced. In the form of the invention shown in Figs. 1 and 2 the cross sectional configuration of the opening 35 corresponds to the cross sectional configuration of the piston 8 and as has been previously stated this configuration may be round, triangular, square, hexagonal, or other desired shape.

Figure 3:
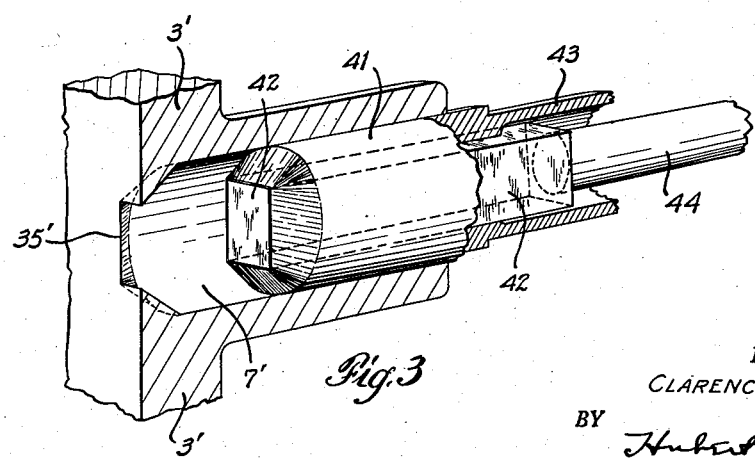
Fig. 3 is an enlarged fragmentary perspective view of a single station of an apparatus such as is shown in Fig. 2 but illustrating a slightly modified form of a portion of the mechanism.

Fig. 3 illustrates a slightly modified form of the present invention which utilizes the principles of my copending application Serial No. 93,599. In this figure the rotary member 3' has one or more openings 35' which communicate with molding cavities 7'. The molding cavities in such a case have an increased cross sectional area and a decreased depth as compared with the cross sectional area and the length of the mass produced. Mounted for sliding movement within the molding cavity is a dual piston member which comprises a first piston member 41 which may fit adjacent the wall of the molding cavity. Mounted for sliding movement within the first piston 41 may be a second piston 42. The piston 41 may be carried by a sleeve 43 to permit actuation of the piston 41 such as by a cylindrical cam similar to that indicated by the numeral 15 in Figs. 1 and 2. Similarly, the piston 42 may be carried by a piston rod 44 which may also be actuated by a second cylindrical cam similar to the cam 15. Preferably the cross sectional configuration of the molding cavity is circular and the piston 41 may be cylindrical and fit closely adjacent the walls of the molding cavity where the nature of the plastic material makes this necessary or desirable. These forms are believed preferable since they may be easily formed by readily available production tools. The molding cavity opening 35' which comprises a forming aperture and corresponds to the cross sectional configuration of the plastic mass to be produced is indicated in Fig. 3 as being square. Similarly the piston 42 is also square in cross section and corresponds to the size of the molding cavity opening 35' so that it may extend through the opening 35' and deposit the plastic mass onto a suitable support which may be spaced from the end face of the rotary member 3'. It will be readily understood that the forming aperture 35' and the piston member 42 may be of another desirable cross sectional configuration such as triangular, round, rectangular, hexagonal, etc.

The purpose of providing a molding cavity having an increased cross sectional area is to reduce the required depth of the molding cavity and thus to facilitate filling the molding cavity with a decreased pressure applied to the plastic material. In operation the molding cavity may be filled by simultaneously retracting the piston members 41 and 42 while forcing plastic material under pressure into the molding cavity. To expel the plastic material and produce the formed mass, the two piston members 41 and 42 may be moved simultaneously until the piston 41 is adjacent the forming aperture 35' of the molding cavity. At this point the movement of the piston 41 may cease while that of the piston 42 continues so that the expelling of the plastic mass may be completed by the movement of the piston member 42. The piston 42 may be moved outwardly through the forming aperture 35' and deposit the formed mass on a suitable support member such as the member 22 which may have previously been lined with the desired type of enwrapment.

In applying the principles of overfilling and expelling to insure complete filling and compacting of the plastic material in the molding cavity, the mechanisms which actuate the pistons 41 and 42 may be designed so that either or both of these pistons may be retracted beyond the desired amount and may then be returned to expel any excess of plastic material. Likewise, the actuating mechanism may be provided with a means for adjusting the final size of the molding cavity as was described in connection with Figs. 1 and 2 to permit a variation in the quantity of plastic material to be formed by the molding cavity.

By the use of the present invention a series or sequence of units of plastic material may be produced on a continuous basis. As described in my previously referred to copending application Serial No. 90,852, the formed units may be packaged while still carried by the support members. Any suitable enwrapment may be utilized to accomplish packaging. Examples of satisfactory enwrapments are shown and described in my copending applications Serial No. 56,942, filed October 28, 1948, and entitled Wrappers; Serial No. 73,295, filed January 28, 1949, and entitled Chained Enwrapments; and Serial No. 83,044, filed March 23, 1949, and entitled Articles for Use in Packaging.

It is believed desirable to utilize an enwrapment which has been folded to a V-shaped configuration since such an enwrapment may be readily applied to a support member such as the support member 22 which has a V-shaped configuration. Each enwrapment may be properly aligned in the support member and in addition the mass of plastic material may be accurately aligned with respect to the wrapper. These factors facilitate the production of uniform packages and permit the use of precisely registered printing applied to the wrapper with assurance that such printing will appear at the same position on successive packages. It is believed beneficial to provide a means for gripping the enwrapment to hold it with respect to the support member so that the mass may be deposited in the enwrapment at a uniform location. For this purpose the support member may be provided with suitable apertures or ports disposed along its receiving surfaces so that a suitable vacuum pump may be connected therewith to exhaust air through such ports and hold the enwrapment in place. The use of an enwrapment which may be selected and individually fed from a sequence is very advantageous in conjunction with a continuous operating cycle since it is not necessary to shut down the forming operations when increasing the supply of enwrapments. This feature is important with plastics made by a continuous process as a shut down of the forming machine generally requires reprocessing of the plastic produced during the shut-down period. Where enwrapments are fed from a roll the replacement of an exhausted roll by a fresh roll requires a shut down.

When handling some types of plastic materials and also with some forms of enwrapment it may be desirable to change the angle at which the plastic mass is expressed from the molding cavity. For example, in some instances it may be desirable that the shaft 2 be disposed in a vertical position or at some angle rather than the horizontal position shown in the drawings. It will be noted that if this is done the angle at which the molding cavity is filled will be opposite to the angle at which the plastic is expelled from the molding cavity. If the molding cavity is tilted to expel in a downward direction the manifold and direction of forcing plastic material into the molding cavity will be in an upward direction.

It may be seen that the present invention facilitates the production of accurate and uniform plastic masses each of which contains a desired predetermined amount which may be closely controlled. Since the molding cavity is overfilled and any excess forced from the molding cavity against the pressure of the plastic material flowing from the source of supply, each molding cavity will be filled with the precise desired amount of plastic material. Further, the plastic material in the molding cavity may be compacted from both ends so that the mass produced will not contain voids or other defects. By the use of a piston member mounted for sliding movement in the molding cavity, whether the piston is single or multiple, the problem of displacement of air from the molding cavity as the plastic material is forced therein is obviated.

Each of the units of plastic material produced may be accurate in size and uniform in shape and appearance. Even though the plastic material may contain entrained air or may have a tendency to adhere to surfaces it may contact, there will be no tendency to cause surface irregularities on the formed mass. The widened portion of the cam track 14, which extends from about V o'clock to about X o'clock as shown in Figure 1, permits any internal pressure, after the amount of material in the molding cavity has been finally determined, to be dissipated by a gradual expansion of the contents of the molding cavity prior to the plastic material being expelled. The mounting of the support member for movement along the end face of the rotary member 3 provides for accurate and clean separation of the formed mass from the piston member to which the plastic might otherwise tend to adhere.

Separation of the formed mass from the piston member is also beneficially assisted by the cam track 14. Although the piston may be actuated in any suitable manner the use of a cylindrical cam is desirable due to the close control which it may have on the piston. After the piston members have been allowed to float because of the widened portion of the cam track, extending from about V o'clock to about X o'clock, the cam track narrows to approximately the diameter of the roller followers 13 and thereafter closely controls each follower and its associated piston. When each piston is moved to express a mass from the molding cavity the cam track 14 causes the piston to extend to a fixed point spaced outwardly from the end face of the rotary member 3. This fixed point is closely adjacent the path of movement of the support member 22 to provide for the desired clean separation of the mass and piston. Obviously any adjustment in the amount of the formed masses due to movement of the movable section 29 of the cam track, will result in a variation in the length of the formed masses and will be evidenced by the distance each mass extends from the fixed point to which the mass is advanced by each piston member.

The present invention also facilitates the production of uniform accurate masses by being adapted to a continuous cycle operation whereby the plastic material may flow without stopping and starting and by the fact that the molding cavities are completely filled with plastic since they are overfilled and any excess returned from the molding cavity. The design and arrangement of the mechanism assist in producing accurate and controlled quantities of the units or masses. This greater accuracy of the measured masses decreases appreciably the amount of overage required to insure that each mass exceeds the minimum permissible quantity.

In some instances it may be desirable to provide control mechanisms for the apparatus shown in the drawings. As described in my previously identified copending application Serial No. 71,195, the pressure from the source of supply may control the speed of the rotary member. Thus, the molding cavities may be filled at a rate which may vary according to the rate at which the plastic material is fed to the supply line and manifold member.

While Figure 1 shows a complete operating cycle and sequence, it will be recognized that this is only for purposes of explanation and illustration. The sequence and timing of the various operations may be modified without changing the principles which have been described.

It will be understood that the foregoing description of preferred embodiments of the invention is for the purpose of explanation and illustration and numerous variations and modifications other than those which have been described may be made without departing from the spirit of the invention.

What I claim is:

1. Apparatus for producing unit masses of plastic material which comprises a molding unit, a piston member mounted for sliding movement within said molding unit, a source of supply of plastic material movable with respect to said molding unit into and out of communication with said molding unit, means for forcing plastic material through said source of supply at super-atmospheric pressure, and means for actuating said piston to overfill and expel plastic material from said molding unit while the molding unit is in communication with plastic material under pressure and for depositing a unit mass of plastic material of predetermined quantity from said molding unit when the molding unit is not in communication with plastic material under pressure.

2. Apparatus for producing formed units of plastic material which comprises a series of movable molding units, a source of supply of plastic material under super-atmospheric pressure disposed adjacent the path of said molding units, a piston member mounted for sliding movement in each of said molding units, and means for actuating said piston members during movement of said molding units to permit overfilling said molding units with plastic material from said source of supply and expelling any excess over a desired predetermined quantity, said actuating means causing any excess of plastic material to be expelled while said molding units are in communication with said source of supply under super-atmospheric pressure.

3. In apparatus for producing formed masses of plastic material of a predetermined quantity, a rotary member having portions defining a molding cavity opening from a face of said member, a stationary member disposed in abutting relation to said face of said rotary member, said stationary member including an aperture therethrough in communication with a source of supply of plastic material under superatmospheric pressure and portions surrounding said aperture disposed in frictional engagement with said face of said rotary member, a piston member mounted for sliding movement in said molding cavity, and means for actuating said piston member to overfill and expel plastic material from said molding cavity while the molding cavity is in communication with the aperture through said stationary member.

4. Apparatus for producing formed masses of plastic material which comprises, a plurality of spaced molding units defining molding cavities and movable in a closed path, a piston member mounted for sliding movement in each of said molding cavities, a source of supply of plastic material under pressure disposed adjacent the path of said molding cavities and extending along said path for at least the distance between adjacent cavities, means for flowing plastic material from said source of supply at a substantially uniform rate under super-atmospheric pressure, and means for actuating said pistons to permit flowing of plastic material into said molding cavities and expelling of formed masses therefrom, said piston actuating means including means for overfilling and expelling plastic material from said molding cavities while said cavities are in communication with said source of supply of plastic material under pressure.

5. In apparatus for forming masses of plastic material, a molding unit movable past a source of supply of plastic material under super-atmospheric pressure, a piston member mounted for sliding movement in said molding unit, means for withdrawing and returning said piston member according to a predetermined pattern with respect to said molding unit while said molding unit is in communication with said plastic material under pressure, and means for advancing said piston member to a predetermined position with respect to said molding unit to express a formed mass of plastic material.

6. Apparatus for forming a mass of plastic material which comprises a molding unit movable adjacent a source of supply of plastic material under super-atmospheric pressure, a piston member mounted for sliding movement in said molding unit, means for withdrawing and partially returning said piston member with respect to said molding unit while said molding unit is in communication with said plastic material under pressure, means for permitting free movement of said piston member after said molding unit is no longer in communication with said plastic material under pressure, and means for moving said piston member to a predetermined point with respect to said molding unit to express a formed mass of plastic material from said molding unit.

7. Apparatus for forming masses of plastic material which comprises, a rotary member, a plurality of molding cavities defined in an end face of said rotary member, a piston member mounted for sliding movement in each of said molding cavities, a stationary manifold member mounted adjacent said end face of said rotary member in line with the path of movement of said molding cavities, a source of supply of plastic material under super-atmospheric pressure leading to said manifold member, and cam means to actuate said piston members to withdraw and partially return with respect to said molding cavities as said cavities successively move adjacent and are in communication with said manifold member and to expel a formed mass of plastic material from each of said molding cavities during movement of said cavities not adjacent said manifold member.

8. The method of producing a formed unit of plastic material which comprises apportioning a predetermined volume of plastic material from a source of supply under greater than atmospheric pressure, applying pressure from a source other than the source of supply of material under pressure to compact said predetermined volume of plastic material to a smaller predetermined volume against the resistance of the pressure of said source of supply of plastic material, sealing said smaller predetermined volume of plastic material from said source of supply, forming said smaller predetermined volume of plastic material to provide a shaped mass, and depositing said shaped mass for packaging.

9. The method of producing a formed unit of plastic material which comprises apportioning a predetermined volume of plastic material from a source of supply under greater than atmospheric pressure, applying pressure from a source other than the source of supply of material under pressure to compact said predetermined volume of plastic material to a smaller predetermined volume against the resistance of the pressure of said source of supply of plastic material, sealing said smaller predetermined volume of plastic material from said source of supply, permitting expansion of said smaller predetermined volume to relieve any internal pressure in said plastic material, forming said smaller predetermined volume of plastic material to provide a shaped mass, and depositing said shaped mass for packaging.

10. The method of producing a formed unit of plastic material which comprises flowing plastic material under pressure greater than atmospheric into a measuring cavity, decreasing the volume of said measuring cavity to a predetermined size while said cavity is in communication with the pressure of the plastic material with which the cavity is filled, sealing said cavity from said pressure, and expelling said predetermined volume of plastic material to produce a formed unit.

11. The method of producing formed units of plastic material which comprises successively forcing plastic material under pressure greater than atmospheric into each of a plurality of predetermined volumes, successively decreasing each of said volumes to a smaller predetermined size against said feeding pressure, successively separating each of said volumes from communication with said source of plastic material under pressure, and successively forming said predetermined volumes to provide unit masses of plastic material having a substantially uniform shape and weight.

12. The method of producing a formed unit of plastic material which comprises increasing the volume of a measuring cavity while in communication with a source of supply of plastic material under pressure greater than atmospheric, decreasing the volume of said measuring cavity while in communication with said source of supply of plastic material until said volume includes a predetermined amount, sealing said volume from communication with said source of supply of plastic material, and decreasing the volume of said measuring cavity while said cavity is in communication with atmospheric pressure to expel a formed predetermined mass of plastic material.

13. The method of producing masses of plastic material which comprises continuously and uniformly flowing plastic material under pressure greater than atmospheric, successively apportioning said flow into a series of predetermined volumes, successively decreasing said volumes to smaller predetermined volumes against the pressure of said flow, successively separating said volumes from communication with said flow, and successively depositing said predetermined volumes as formed masses for packaging.

14. The method of producing masses of plastic material which comprises continuously and uniformly flowing plastic material under pressure greater than atmospheric, successfully apportioning said flow into a series of predetermined volumes, successively decreasing said volumes to smaller predetermined volumes against the pressure of said flow, successively permitting expansion of said volumes to relieve any internal pressure in said plastic material, successively separating said volumes from communication with said flow, and successively depositing said predetermined volumes as formed masses for packaging.

CLARENCE W. VOGT.

References Cited in the file of this patent

UNITED STATES PATENTS

| Number | Name | Date |
|---|---|---|
| 692,903 | Rainbow | Feb. 11, 1902 |
| 1,825,844 | Ainslie | Oct. 6, 1931 |
| 2,023,658 | Ahacich | Dec. 10, 1935 |
| 2,193,140 | Mortenson | Mar. 12, 1940 |
| 2,494,212 | Spriggs et al. | Jan. 10, 1950 |

FOREIGN PATENTS

| Number | Country | Date |
|---|---|---|
| 25,298 | Great Britain | Nov. 9, 1906 |